Figure 1:
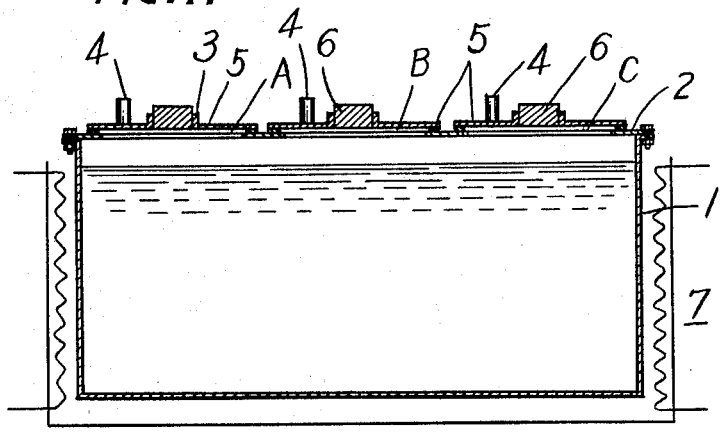

Oct. 11, 1966

TAKAO NAKAMURA 3,278,402

METHOD OF CONTINUOUS PRODUCTION
OF HIGH PURITY BERYLLIUM METAL

Filed Aug. 13, 1962

2 Sheets-Sheet 1

INVENTOR

Takao Nakamura

BY *Stevens, Davis, Miller & Mosher*

ATTORNEYS

INVENTOR

Takao Nakamura

United States Patent Office 3,278,402
Patented Oct. 11, 1966

3,278,402
METHOD OF CONTINUOUS PRODUCTION OF HIGH PURITY BERYLLIUM METAL
Takao Nakamura, Mizuho-ku, Nagoya, Japan, assignor to NGK Insulators, Ltd., Nagoya, Japan, a corporation of Japan
Filed Aug. 13, 1962, Ser. No. 216,585
Claims priority, application Japan, Aug. 17, 1961, 36/29,235
2 Claims. (Cl. 204—65)

The present invention relates to a method for continuous production of high purity beryllium flake from crude beryllium chloride.

Since beryllium metal has a low density (1.85 g./cm.$^3$) and has high melting point (above 1,285° C.) and has, in addition, strength comparable to mild steel, it is a very useful material for airplanes and is considered as an indispensable material for space development. Moreover, since beryllium has the smallest absorption cross section for thermal neutrons among metals and has a large scattering cross section so that it has very excellent nuclear properties, it is considered as a most suitable material for reactors, more particularly, for moderators, reflectors and canning materials for fuels. Under the bombardment of $\alpha$-particles neutrons are generated by the reaction of Be($\alpha$, $n$)He, so that it is used as a neutron source as is radium. On the other hand, most general use is for the X-ray tube windows due to the fact that beryllium has a high X-ray permeability, about 17 times higher than that of aluminum foil which has heretofore been used. Nevertheless, although beryllium is a metal having very desirable properties which ordinary metals do not possess and is required for many applications, it has the disadvantage that high purity metal can not easily be obtained at sufficiently low cost.

The methods of obtaining metallic beryllium used at the present time, beryllium is produced commercially by (a) Reduction of beryllium fluoride with magnesium; and (b) Electrolysis of fused beryllium chloride.

According to the first method, beryllium pebbles can be obtained at a comparatively low cost, yet they contain considerable impurities and it is difficult to obtain high purity metal. According to the latter method of fused salt electrolysis, high purity metal can be produced, but it has the disadvantage that the production cost is too high and accordingly, the above two methods are not satisfactory.

The conventional fused salt electrolysis has been carried out batchwise whereby the beryllium flake deposited by the electrolysis is recovered by interrupting the electrolysis. In order to facilitate the separation of the deposited beryllium flake, the fused salt only is shifted to another cell or the beryllium is electrolytically deposited on a cathode which may be easily taken out of the bath. According to this latter method, the cathode and flake is contaminated with a large quantity of fused salt resulting in a large material loss as well as time losses due to the interruption of operation so that its cost is extremely high.

Further, the batch system has the disadvantage that it is very expensive due to the use of beryllium chloride of high purity prepared by re-distillation of crude beryllium chloride which has been obtained by chlorinating beryllium oxide. If the crude beryllium chloride is directly used for the electrolysis it requires a pre-electrolysis at a low voltage for depositing impurities only in order to obtain metallic beryllium of high purity and the steps of pre-electrolysis-electrolysis-collecting beryllium flake-feeding crude beryllium chloride-pre-electrolysis-electrolysis, etc., must be repeated so that the time loss is substantial amounting to about one-third of the total time of operation for the operations other than the electrolysis.

The above disadvantages are obviated by the present invention.

Figure 2:
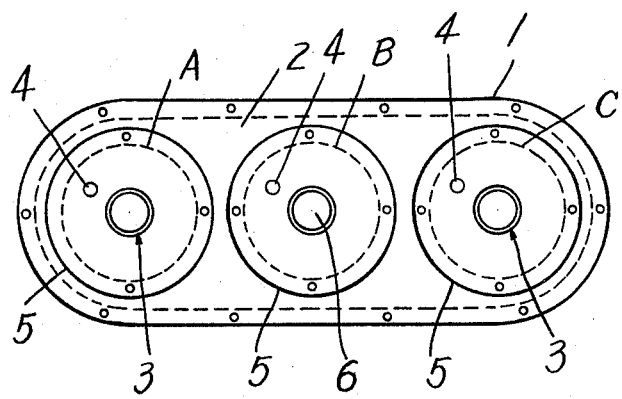
Figure 3:
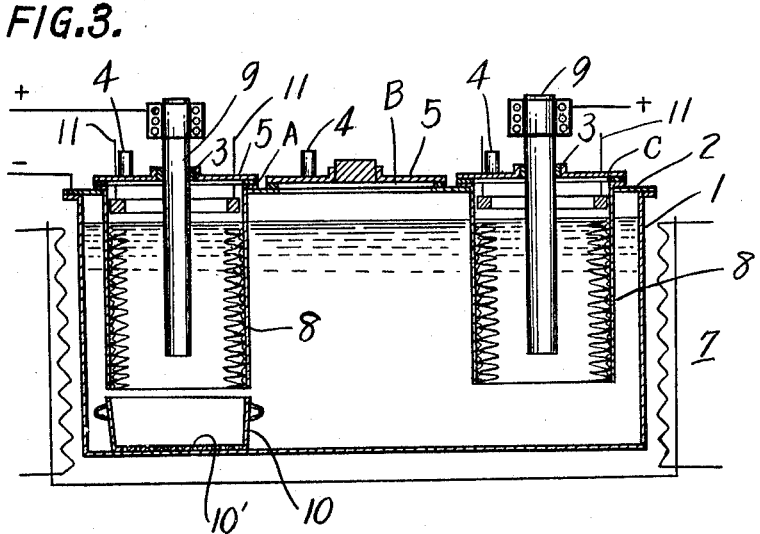
Figure 4:
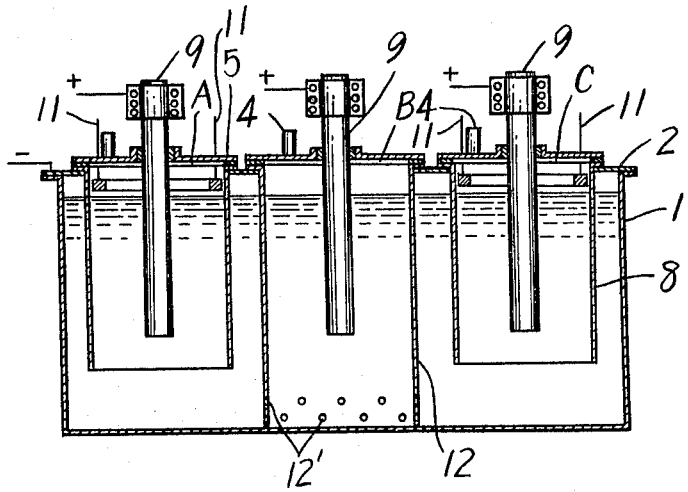

For a better understanding of the method of the invention, reference is taken to the accompanying drawings, in which FIG. 1 is a sectional elevation of a cell for melting the salt, FIG. 2 is a top plan view of FIG. 1, and FIGS. 3 and 4 are diagrammatic sectional views of electrolytic cells during electrolysis.

In carrying out the method of the invention the apparatus as shown in FIGS. 1 to 4 is used. This equipment is designed for the collection of metallic beryllium flake of high purity from crude beryllium chloride continuously and the manner of carrying out the present method will be explained hereafter referring to the drawings.

The crude material, preferably beryllium chloride to be used in the method of the invention is prepared by mixing beryllium oxide obtainable on the market (containing 90 to 97% BeO along with oxides of Si, Fe, Al, Mg, Mn and Ca) with carbon at a ratio of about 2:1. After briquetting and drying this mixture is charged into a chlorinating furnace where it is chlorinated by treatment with chlorine gas at a temperature of from 800 to 1,000° C. The beryllium chloride product contains chlorides of Si, Fe, Al, Mg, Mn, Ca etc. and a small quantity of BeO, Be(OH)$_2$ and C as impurities. 50 to 60% of this crude beryllium chloride and 50 to 40% of dried sodium chloride are thoroughly mixed and charged into nickel cell 1 which is then covered with a cover 2 having three openings A, B and C for inserting cathodes. Each of the openings A, B and C of the cover is sealed with a circular disc cover 5 made of nickel having an opening 3 for inserting a graphite electrode and an opening 4 for exhausting chlorine. The opening 3 for inserting a graphite electrode is sealed with an asbestos plug 6. The cell is heated in an electric furnace 7 so that the temperature in the cell is maintained at 330 to 400° C. for melting the raw material therein.

Then nickel cathodes 8 are inserted into the openings A and C of the cover 5 respectively as shown in FIG. 3 and the upper portion of these electrodes are secured to the cell 1 and also the asbestos plug 6 is taken off and the graphite electrode 9 electrically insulated by means of an asbestos packing is inserted into the opening 3 and secured thereto, then the positive side of a rectifier is connected to the graphite electrode and the negative side of the nickel cell 1, wherein electrodes at A and C are connected in parallel to the electric source. Under such condition, electric current is supplied from the rectifier to effect electrolysis. As the electrolysis proceeds, beryllium deposits in a flake state on the inside surface of the nickel cathode and the chlorine gas generated at the anode is taken out of the cell through the exhaust opening 4 and treated by a suitable process. Thus the electrolysis is carried out until a substantial amount of beryllium flake deposits on the cathode surface and growth radially towards the anode, then the circular disc cover 5 at the B-position is taken off and a porous nickel receiver 10 provided with operating lugs is put into the cell and located directly below the cathode at the A-position. The deposited flake is scraped down by means of a scraping piece with rods 11 to be collected in the receiver 10. Such operations are conducted while the current is supplied. When the operation at the A-position is finished receiver 10 is shifted to the C-position and the similar operation is conducted. Then the receiver 10 containing beryllium flake is taken out of the cell through the opening at the B-position. When the receiver is lifted up, the fused salt attached to the flake and the receiver drips down through fine holes 10′ of the receiver into the cell. The flake thus taken out of the cell is washed with water, alcohol or acetone and dried.

The flake thus obtained by the first electrolysis after preparing the fused salt as above described has poor purity since it contains impurities of more electro-positive elements than beryllium from said crude beryllium chloride and sodium chloride, such as Cu, Fe, Al, Mn, Mg, Si, Ni and the like, which are selectively deposited out so that the lot should be preserved separately.

The electrolytic cell still continues the electrolysis under such conditions so that the composition of the fused salt which has been changed by the amount of beryllium chloride corresponding to the product beryllium flake and a small quantity of beryllium chloride and sodium chloride in the fused salt taken out of the cell attached to the receiver, should be restored.

According to the invention, the composition of the bath is maintained by the addition of crude beryllium chloride thereto.

As first, a nickel cathode 12 for pre-electrolysis which may have some small holes 12′ at the lower part is inserted through the opening at the B-position into the cell 1 until its lower end makes tight contact with the bottom of the cell and a mixture of crude beryllium chloride and sodium chloride to be supplied is charged into the cylinder, then the previously melted fused salt is forced out of the cylinder through the communication holes at the lower part of the cylinder and the non-fused supplied salts float on the upper portion and gradually fuses at the contact surface. After the supplied salts have completely fused, a graphite anode is fitted similarly to those at the A- and C-positions and is connected to the direct current source to effect electrolysis at a voltage of about ½ that of the A- and C-positions for a suitable period (preferably 30 minutes to 1 hour). During this step the impurities which are more electropositive than beryllium deposit on the inner surface of the pre-electrolysis cathode cylinder. This step is referred to as the pre-electrolysis. The concentrations of impurities in the fused salt in the pre-electrolysis are high and impurities deposit on the inner surface of the cathode at the first period of pre-electrolysis so that the impure elements do not substantially leak out of the cathode by diffusion. After the preliminary electrolysis is completed the graphite anode and the pre-electrolysis cathode on which a large amount of impure elements have deposited are taken out of the cell and the opening at the B-position is sealed by means of a circular nickel plate cover. By taking out the pre-electrolysis cathode the fused salts having high concentration of beryllium chloride in the cathode is spread throughout the cell 1 so that he concentration of beryllium chloride in the fused salt is restored substantially to the original condition. By providing a very fine nickel gauze at the bottom of the pre-electrolysis cathode the undissolved portion of the make-up salt can be filtered out when the gauze is lifted up. Next, when the flake at the A- and C-positions have grown sufficiently a porous receiver 10 is again put into the cell through the opening at the B-position to scrape out and collect the flake. Then crude beryllium chloride and sodium chloride are added to effect pre-electrolysis as previously described and thus the above operations are repeated and beryllium flake can be taken continuously.

The beryllium flake thus obtained has very high purity substantially equal to the flake obtained by using distilled and refined beryllium chloride and some times even higher.

This continuous operation may be carried out for as much as 1 to 3 months and when the undissolved residue and fine beryllium flake are deposited in the fused salt to make the continuation of operation difficult the transparent fused salt on the upper layer is transferred to the other cell and after the deposits are removed, the fused salt is returned to the former cell to continue the electrolysis.

It is necessary during such continuous operation to analyze the concentration of beryllium chloride in the fused salt at intervals and to maintain the composition in the desired condition.

The yield of beryllium by this process is very high and exhibits more than 10% improvement in yield over that obtainable in the process by using a single electrolytic cell of same capacity operated by repeating pre-electrolysis-normal electrolysis-collection-supplementation.

The method of the invention will be explained further in detail by means of the following example.

*Example*

148 kg. of crude beryllium chloride and 112 kg. of dried sodium chloride were thoroughly mixed together in an enclosed mixer. The mixed salt thus obtained was charged in a small quantity each time into a nickel cell of 35 cm. breadth, 100 cm. total length and 50 cm. depth, then the cell was sealed with a cover and heated from its outside by means of an electric heater maintaining the temperature of fused salt at about 350° C. to fuse slowly during 24 hours and after the total salt had fused transparently the heating was continued further for 24 hours. The depth of the fused salt was 45 cm. Then two nickel cathodes having inner dia. of 28 cm. and a length of 40 cm. were inserted through the openings at A- and C-positions, and at its middle a graphite anode having 2 inches dia. was dipped into the fused salt up to the length of 27 cm. Under such condition the first electrolysis was effected at a voltage of 6 v. and the current per cell was 200 amp. After the electrolysis of 7 hours the deposited flake was collected in a receiver and the weight of flake thus taken out was 360 g. and showed the following analysis:

Fe, 900; Al, 300; Si, 340; Cu, 360; Ni, 550; Ca, 120; Mg, 85 p.p.m.

Then while continuing the electrolysis, a pre-electrolysis cathode was inserted, into which a mixture of 4.1 kg. of crude beryllium chloride and 580 g. of sodium chloride was supplied and fused after sufficiently agitated and the pre-electrolysis was carried out at a voltage of about 3 v. and a current of about 100 amp.

The flake thus collected from the pre-electrolysis was very fine crystal and the purity was ascertained as follows by the result of analysis:

Fe, 420; Al, 130; Si, 150; Cu, 180; Ni, 530; Ca, 95; Mg, 60 p.p.m.

Further continuing the electrolysis, flake deposited on the cathode was scratched out per 7 to 10 hours in a receiver and taken out of the cell and the flake was washed and dried and the result showed that the purity had been exceedingly improved after the second yield. The typical example is as follows:

Fe, 30; Al, 20; Si, 60; Cu, 20; Ni, 40; Ca, <60; Mg, <20 p.p.m.

The above operation was continued for 45 days. The supplied raw materials were 623 kg. of crude beryllium chloride, and 88 kg. of sodium chloride while the obtained beryllium flake was 51.5 kg. The current efficiency was 76.5% and the yield of beryllium flake from the supplied beryllium chloride was 72.5%.

What I claim is:

1. In a method of continuously producing high purity beryllium metal by electrolytic decomposition of a fused salt bath of crude beryllium chloride and sodium chloride, generally including the steps of electrolytically decomposing a fused salt bath of crude beryllium chloride and sodium chloride to produce beryllium metal, collecting and removing from the bath beryllium metal, and adding to the bath new charges of crude beryllium and sodium chloride, the improvement comprising carrying out said adding step by substantially confining a volume of said bath from the remainder of said bath, but within said bath adding a new charge of crude beryllium chloride and sodium chloride to said confined volume, pre-electrolytically decomposing said confined volume of said bath to deposit therefrom impurities, removing said deposited impurities, and releasing said confined volume of said bath to mix with the remainder of said bath.

2. An apparatus for the continuous production of high purity beryllium metal by electrolytic decomposition of crude beryllium chloride comprising a main electrolytic cell for effecting electrolysis by an external heat, a pre-electrolytic cathode cylinder adapted to be charged with a mixed salt of crude beryllium chloride and sodium chloride and to effect pre-electrolysis thereof and detachably inserted into said main electrolytic cell to form a part thereof and also provided at its center with a graphite anode and with holes communicated with said main electrolytic cell for leaking out purified electrolyte free from impurities into said main electrolytic cell, a plurality of main electrolytic cathode cylinders each provided at its center with a graphite anode and for effecting electrolysis of the purified electrolyte fed from said pre-electrolytic cathode cylinder through said holes and depositing high purity beryllium metal on the inside wall thereof, means for scraping off beryllium deposited on said main electrolytic cathode cylinder, and means for collecting the scraped out beryllium.

References Cited by the Examiner
UNITED STATES PATENTS
2,843,544   7/1958   Morana _____ 204—65

JOHN H. MACK, *Primary Examiner.*

H. S. WILLIAMS, *Assistant Examiner.*